United States Patent
Liu et al.

(10) Patent No.: US 12,155,658 B2
(45) Date of Patent: Nov. 26, 2024

(54) MULTI-TENANT TWO-STAGE AUTHENTICATION

(71) Applicant: Salesforce, Inc., San Francisco, CA (US)

(72) Inventors: Keye Liu, San Francisco, CA (US); Dai Duong Doan, San Francisco, CA (US); Kaidi Xu, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 376 days.

(21) Appl. No.: 17/538,761

(22) Filed: Nov. 30, 2021

(65) Prior Publication Data
US 2023/0171253 A1    Jun. 1, 2023

(51) Int. Cl.
*H04L 9/40*    (2022.01)
*G06F 9/54*    (2006.01)

(52) U.S. Cl.
CPC .......... *H04L 63/0884* (2013.01); *G06F 9/541* (2013.01); *H04L 63/083* (2013.01); *H04L 63/123* (2013.01); *H04L 2463/082* (2013.01)

(58) Field of Classification Search
CPC . H04L 63/0884; H04L 63/083; H04L 63/123; H04L 2463/082; G06F 9/541
See application file for complete search history.

(56) References Cited

U.S. PATENT DOCUMENTS

| | | | |
|---|---|---|---|
| 9,191,291 B2 | 11/2015 | Doan | |
| 9,553,783 B2 | 1/2017 | Doan | |
| 9,697,287 B2 | 7/2017 | Doan | |
| 9,819,568 B2 | 11/2017 | Doan | |
| 10,152,497 B2 | 12/2018 | Doan et al. | |
| 10,387,388 B2 | 8/2019 | Doan et al. | |
| 10,650,337 B2 | 5/2020 | Lalani et al. | |
| 10,713,588 B2 | 7/2020 | Doan et al. | |
| 10,733,613 B2 | 8/2020 | Vaishnav et al. | |
| 10,901,996 B2 | 1/2021 | Doan et al. | |
| 11,164,118 B1 | 11/2021 | Doan et al. | |
| 2017/0171201 A1* | 6/2017 | Matsugashita | H04L 63/20 |
| 2017/0277768 A1 | 9/2017 | Doan et al. | |
| 2017/0286441 A1 | 10/2017 | Doan et al. | |
| 2017/0293629 A1 | 10/2017 | Doan et al. | |
| 2018/0293586 A1 | 10/2018 | Doan et al. | |
| 2018/0302405 A1* | 10/2018 | Gordon | H04W 12/06 |
| 2019/0220828 A1 | 7/2019 | Murali et al. | |
| 2019/0236195 A1 | 8/2019 | Sutedjo-The et al. | |
| 2019/0236213 A1* | 8/2019 | Palmert | G06Q 30/0631 |
| 2019/0236217 A1 | 8/2019 | Eroshin et al. | |
| 2019/0372960 A1* | 12/2019 | Huang | H04L 63/061 |
| 2019/0394204 A1* | 12/2019 | Bansal | H04L 63/0815 |
| 2021/0377252 A1* | 12/2021 | Monro | H04L 63/0884 |

* cited by examiner

*Primary Examiner* — Raqiul A Choudhury
(74) *Attorney, Agent, or Firm* — Kwan & Olynick LLP

(57) ABSTRACT

Disclosed are some implementations of systems, apparatus, methods and computer program products for implementing a scalable computing system. The scalable computing system includes an intermediate system that facilitates communications between a core server system and a third-party system. The core server system processes a client request for a third-party service in association with a web page having a corresponding web address. The intermediate system communicates with the core server system to obtain a session token, and transmits the session token and web address to the third-party system. The third-party system may then access the web page via the web address using the session token.

20 Claims, 9 Drawing Sheets

MULTI-TENANT TWO-STAGE AUTHENTICATION

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques for implementing a scalable computing system. More specifically, this patent document discloses techniques for implementing a scalable document generation system using an intermediate system that facilitates communication between a core server system and a third-party system, and protecting data accessed by the third-party system from the core server system via an authentication process.

BACKGROUND

"Cloud computing" services provide shared network-based resources, applications, and information to computers and other devices upon request. In cloud computing environments, services can be provided by servers to users' computer systems via the Internet and wireless networks rather than installing software locally on users' computer systems. A user can interact with social networking systems, electronic mail (email) systems, instant messaging systems, and other software applications in a cloud computing environment.

BRIEF DESCRIPTION OF THE DRAWINGS

The included drawings are for illustrative purposes and serve only to provide examples of possible structures and operations for the disclosed systems, apparatus, methods and computer program products for facilitating implementation of a customizable intent driven system. These drawings in no way limit any changes in form and detail that may be made by one skilled in the art without departing from the spirit and scope of the disclosed implementations.

DETAILED DESCRIPTION

Figure 1:
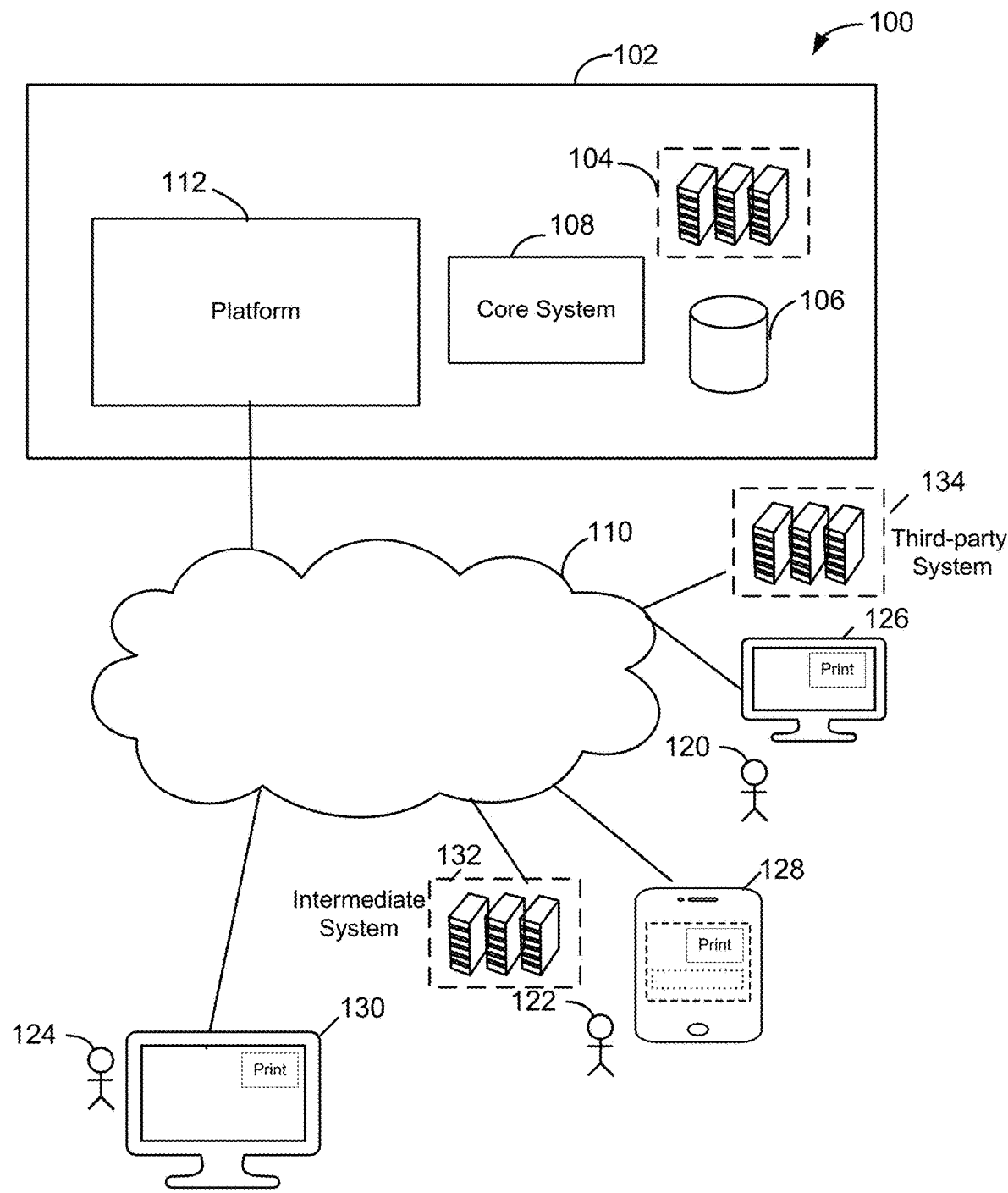
FIG. 1 shows a system diagram of an example of a system 100 in which a scalable computing system can be implemented, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured to implement a scalable computing system such as a scalable document generation system. In some implementations, systems, apparatus, methods, and computer program products are configured to facilitate authentication within a scalable computing system, which can be implemented in a multi-tenant database environment.

In today's work environments, users within organizations often want to generate reports for various purposes. In many instances, a web page is designed to present data in a desired format. Converting a web page to a portable document format (PDF) document is a highly demanded feature.

To facilitate the generation of PDFs, many websites provide a "print" button that enables a web document to be printed to a PDF. However, for large organizations having numerous employees, network traffic can be significant. Furthermore, each web document can include an unlimited number of pages. Moreover, PDF generation is a processing intensive feature that involves conversion of web pages to PDFs. As a result, users can experience substantial delays between the time that they choose to print a web page and the time at which the corresponding PDF is received.

While it is possible for organizations to access a third-party system that generates PDF documents, it is undesirable to provide user login credentials to third-party systems. Moreover, it is preferable to obtain results from third-party systems without requiring users to interact directly with those third-party systems.

In accordance with various implementations, a scalable computing system such as a document generation system includes a core server system that receives a third-party service request (e.g., print request) for a particular web page from a user of the core server system, a third-party system configured to generate a document such as a PDF using the web page, and an intermediate system that facilitates communication between the core server system and the third-party system.

In some implementations, the third-party system includes a document generation system such as a PDF generation system. In other implementations, the third-party system can provide a variety of services related to a web page to which it is provided access by the core server system.

Through the use of an intermediate system, it is possible to decouple the third-party system from the core server system. As a result, it is possible to scale any of the components of the computing system. More particularly, the core server system, third-party system, and/or intermediate system can be scaled independently from one another to include any number of servers. Therefore, the disclosed system may accommodate an unlimited number of users and documents without size limitation.

In some implementations, the scalability of the computing system is further facilitated via one or more sets of queues. More particularly, communication between the core server system and intermediate system may be facilitated via a first set of queues, while communication between the intermediate system and third-party system may be facilitated via a second set of queues.

In addition, in some implementations, documents generated by the third-party system can be provided to the core server system via a storage medium. The storage medium may serve as a temporary memory location in which documents may be stored, enabling the core server system to retrieve the documents from the storage medium at a time when the core server system is not occupied. This enables an unlimited number of documents to be generated by third-party system(s) and provided to the core server system without the risk of a timeout.

Protecting organizational data and user privacy is paramount to building trust and fostering business successes. In accordance with various implementations, the core server system supports an authentication process that grants privilege to an external third-party system to access a particular web page on behalf of a user of an organization.

In some implementations, the core server system and intermediate system have a trusted relationship. As a result, the core system may provide confidential information (e.g., user ID) associated with a print request to the intermediate system. Using this confidential information, the intermediate system can obtain a session token (i.e., session ID) from the core server system so that it can provide the session token to the third-party system, enabling the third-party system to access a web page using the session token. In this manner, the core server system may grant privilege to the third-party service to access a particular web page without exposing confidential information such as a user ID or login credentials to the third-party service.

In some implementations, a scalable computing system may support multiple tenants using a multi-tenant database system. Each organization may be associated with a corresponding tenant identifier (ID).

In accordance with various implementations, a two-stage authentication process is performed to grant permission to the third-party service to access a particular web page. In the first stage, to ensure that a user from one organization cannot access data from another organization, the intermediate system requests, on behalf of the user, a cloud-to-cloud (C2C) session token (i.e., cloud session token) specific to the user's organization. The core server system generates the cloud session token and transmits the cloud session token to the intermediate system, thereby establishing trust between the core server system and intermediate system. The intermediate system then requests that a session token be generated for the user by sending a session token request including the cloud session token. Responsive to the request for the session token, the core server system validates the cloud session token and upon successfully validating the cloud session token, generates and transmits a session token to the intermediate system. In the second stage, the intermediate system relays the session token to the third-system with the web address of the web page. The third-party system transmits a web page request including the web address and session token to the core server system, which authenticates the web page request using the session token and provides access to the web page.

In some implementations, the core server system configures a limited session token lifetime in association with the session token request. This limits the exposure of organizational data and further protects against subsequent unauthorized accesses of the data.

FIG. 1 shows a system diagram of an example of a system 100 in which a scalable computing system can be implemented, in accordance with some implementations. Database system 102 includes a variety of different hardware and/or software components that are in communication with each other. In the non-limiting example of FIG. 1, system 102 includes any number of computing devices such as servers 104. Servers 104 can include one or more web servers configurable to execute web applications. Servers 104 are in communication with one or more storage mediums 106 configured to store and maintain relevant data and/or metadata used to perform some of the techniques disclosed herein, as well as to store and maintain relevant data and/or metadata generated by the techniques disclosed herein. Storage mediums 106 may further store computer-readable instructions configured to perform some of the techniques described herein. Storage mediums 106 can also store user accounts/user profiles of users of system 100, as well as database records such as customer relationship management (CRM) records.

System 102 includes core system 108, as described herein. More particularly, core system 108 can support various third-party services, as will be described in further detail below.

In some implementations, system 102 is configured to store user profiles/user accounts associated with users of system 102. Information maintained in a user profile of a user can include a client identifier such an Internet Protocol (IP) address or Media Access Control (MAC) address. In addition, the information can include a unique user identifier such as an alpha-numerical identifier, the user's name, a user email address, and credentials of the user. Credentials of the user can include a username and password. The information can further include job related information such as a job title, role, group, department, organization (e.g., tenant identifier (ID)), and/or experience level, as well as any associated permissions. Profile information such as job related information and any associated permissions can be applied by system 102 to manage access to web applications or services such as those described herein.

Client devices 126, 128, 130 may be in communication with system 102 via network 110. More particularly, client devices 126, 128, 130 may communicate with servers 104 via network 110. For example, network 110 can be the Internet. In another example, network 110 comprises one or more local area networks (LAN) in communication with one or more wide area networks (WAN) such as the Internet.

Embodiments described herein are often implemented in a cloud computing environment, in which network 110, servers 104, and possible additional apparatus and systems such as multi-tenant databases may all be considered part of the "cloud." Servers 104 may be associated with a network domain, such as www.salesforce.com and may be controlled by a data provider associated with the network domain. In this example, employee users 120, 122, 124 of client computing devices 126, 128, 130 have accounts at salesforce.com®. By logging into their accounts, users 126, 128, 130 can access the various services and data provided by system 102 to employees, as described herein. Examples of devices used by users include, but are not limited to, a desktop computer or portable electronic device such as a smartphone, a tablet, a laptop, a wearable device such as Google Glass®, another optical head-mounted display (OHMD) device, a smart watch, etc.

In some implementations, users 120, 122, 124 of client devices 126, 128, 130 can access services provided by system 102 via platform 112 or an application installed on client devices 126, 128, 130. More particularly, client devices 126, 128, 130 can log into system 102 via an application programming interface (API) or via a graphical user interface (GUI) using credentials of corresponding users 120, 122, 124 respectively. Client devices 126, 128, 130 can communicate with system 102 via platform 112. Communications between client devices 126, 128, 130 and system 102 can be initiated by a user 120, 122, 124. Alternatively, communications can be initiated by system 102 and/or application(s) installed on client devices 126, 128, 130. Therefore, communications between client devices 126, 128, 130 and system 102 can be initiated automatically or responsive to a user request.

In some implementations, client devices 126, 128, 130 can submit a third-party request, such as a PDF generation request associated with a web page, via platform 112 or an application installed on client devices 126, 128, 130. Core system 108 communicates with intermediate system 132 regarding the third-party request. Intermediate system handles secure communications between core system 108 and third-party system 134, and facilitates authentication between third-party system 134 and core system 108. Intermediate system 132 obtains a session token from core system 108 and transmits the session token with a web address associated with the web page to third-party system 134, enabling third-party system 134 to use the session token to access the web page from core system 108. In some implementations, third-party system is a portable document format (PDF) generation system configured to convert web documents to PDFs. Example implementations of a scalable computing system will be described in further detail below.

Some implementations may be described in the general context of computing system executable instructions, such as program modules, being executed by a computer. The disclosed implementations may further include objects, data structures, and/or metadata, which may facilitate the implementation of an intent driven system, as described herein.

Some implementations may also be practiced in distributed computing environments where tasks are performed by remote processing devices that are linked through a communications network. In a distributed computing environment, program modules may be located in local and/or remote computer storage media including memory storage devices.

Figure 2:
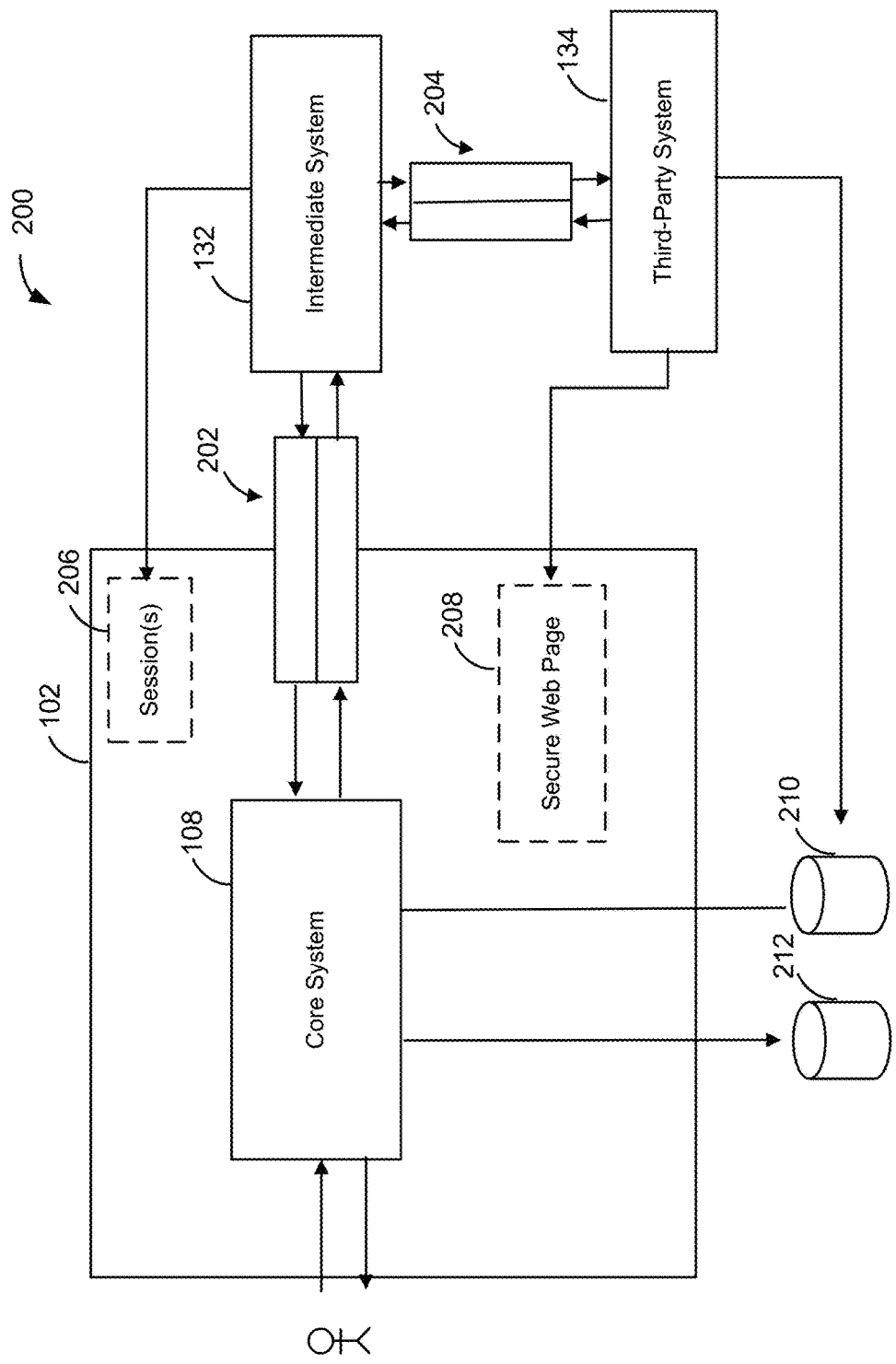
FIG. 2 shows a diagram of an example scalable computing system, in accordance with some implementations.

FIG. 2 shows a diagram of a scalable computing system 200, in accordance with some implementations. Scalable computing system 200 includes core system 108, intermediate system 132, and third-party system 134. As shown in this example, core system 108 may be communicatively coupled to intermediate system 132 via a first set of queues 202. Similarly, intermediate system 132 may be communicatively coupled to third-party system 134 via a second set of queues 204. Each set of queues 202, 204 is independently scalable. Each set of queues 202, 204 can include one or more inbound queues and one or more outbound queues.

In some implementations, both sets of queues 202, 204 are implemented by and accessible via a queuing service. More particularly components such as core system 108, intermediate system 132, and third-party system 134 may subscribe as listeners to specific events (e.g., send print page, print page/invoke URL, document ready, notify document ready). The queueing service may thereafter transmit messages pertaining to the events to the corresponding components via respective queues. Core system 108, intermediate system 132, and third-party system 134 may periodically check queues, which may be assigned to the respective systems. The queueing service may be a non-blocking, asynchronous service.

In this example, a single third-party system is shown. However, it is important to note that this example is merely illustrative and any number of third-party systems may be accessed, as disclosed herein.

As described above, a user can submit a third-party service request such as a print request associated with a particular web page to core system 108. Core system 108 can notify intermediate system 132 of the third-party service request, for example, via first set of queues 202. Intermediate system 132 can then communicate with system 102 to obtain a session token associated with the user for the web page, as shown at 206. Intermediate system 132 can then transmit the pertinent web address and session token to third-party system 134, for example, via second set of queues 204. By transmitting messages via sets of queues 202, 204, this enables the components to retrieve and process messages without the risk of a timeout.

Third-party system 134 accesses the web page using the session token, as shown at 208. Third-party system 134 may then generate results including a document such as a PDF using the web page. Once generated, third-party system 134 may provide the document to core system 108. In this example, the document is provided via a data store 210, which may serve as a temporary data store. This eliminates the risk of a timeout. In some implementations, data store 210 is integral with third-party system 134. Third-party system 134 may notify intermediate system 132 that the document is ready for retrieval. For example, third-party system 134 can transmit a document ready message (e.g., notify document ready message) to intermediate system 132 via second set of queues 204.

In some implementations, the first and second sets of queues 202, 204 are managed by a queueing service that provides access to the queues, as described herein. Each queue may be designated as an inbound or outbound queue.

Intermediate system 132 can then notify core system 108 that the document is ready for retrieval. For example, intermediate system 132 can transmit a document ready message to core system 108 via first set of queues 202.

Core system 108 may then retrieve the document from data store 210 and provide the document to the requesting user. In some implementations, core system 108 stores the document in a database 212, either automatically or responsive to a user request.

Figure 3:
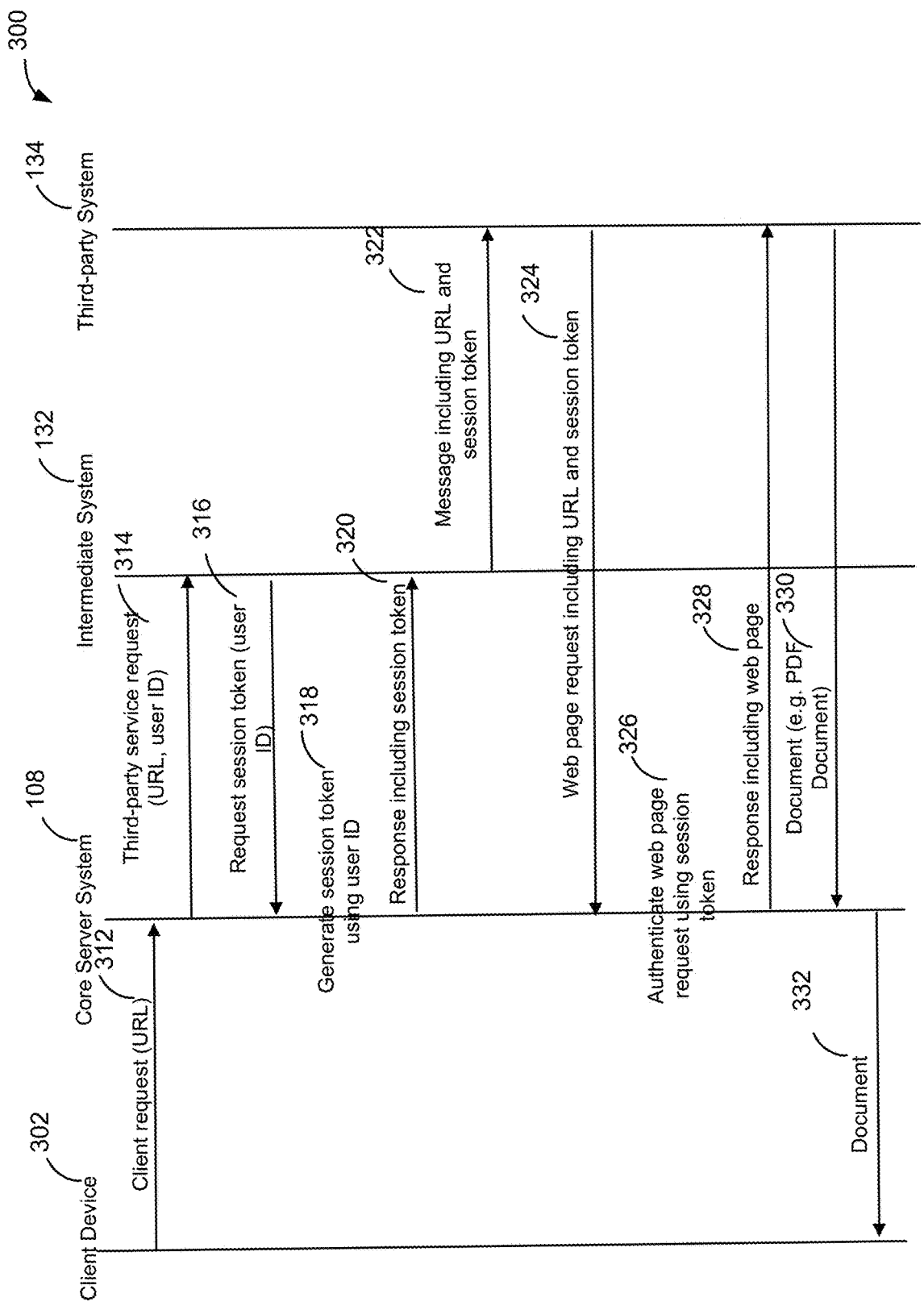
FIG. 3 is a transaction flow diagram of an example communication flow between components of a scalable computing system, in accordance with some implementations.

FIG. 3 is a transaction flow diagram 300 of an example communication flow between components of a scalable computing system, in accordance with some implementations. In this example, a client device, core server system, intermediate system, and third-party system are represented by vertical lines 302, 108, 132, 134, respectively. A user may log into core server system 108 using their credentials (e.g., username and password). The user may subsequently request generation of a document such as a PDF in association with a web page accessed via client device 302. For example, the user may invoke an action such as a PDF call service offered by core server system 108. Upon submission of a request such as a print request, a client request associated with a web page is received by core server system 108 from client device 302 at 312. Core server system 108 may obtain confidential information associated with the user (e.g., user ID and/or tenant ID), for example, via a profile associated with the user. Responsive to the client request, core server system 108 transmits a third-party service request including a web address (e.g., URL) associated with the web page to intermediate system 132 at 314. More particularly, the third-party service request can indicate a request for a third-party service that can be provided by a third-party system such as third-party system 134. The third-party service request can include the confidential information such as a user ID associated with the user. In addition, the third-party service request can include a tenant ID for systems supporting multiple tenants using a multi-tenant database system. The third-party service request can be transmitted via a queue of the first set of queues.

As described above, the user has logged in to core server system 108. However, since intermediate system 132 is a trusted entity, the user's credentials need not be provided to intermediate system 132.

Intermediate system 132 receives or otherwise obtains the third-party service request (e.g., via the queue) and processes the third-party service request. The third-party service request can identify third-party system 134 or, alternatively, intermediate system 132 can identify third-party system 134 capable of satisfying the third-party service request.

Intermediate system 132 is responsible for obtaining a session token on behalf of third-party system 134. Thus, intermediate system 132 generates and transmits a session token request in association with the third-party service request at 314 to core server system 108 at 316. The session token request can include a user ID and optionally a tenant ID (e.g., for systems supporting multiple tenants). The session token request can be transmitted to core server system 108 via an API of core server system 108. In some implementations, the process of obtaining a session token can include multiple steps, as will be described in further detail below with reference to FIG. 4.

Upon receiving a session token request from intermediate system 132, core server system 108 may verify, by accessing a user profile of the user associated with the user ID, that the user is permitted to access the requested web page and associated data. Core server system generates a session token at 318. The session token can be generated, for example, using the user ID (and optionally a tenant ID). In some implementations, core server system 108 configures session token with a limited token lifetime and stores the token lifetime in association with the session token.

Core system 108 transmits a response including the session token to intermediate system 132 at 320 responsive to the session token request. The session token can be transmitted to intermediate system 132 via an API of intermediate system 132. Intermediate system 132 then transmits a message (e.g., print page request) including the web address and session token to third-party system 134 at 322. For example, the message may be transmitted via a queue of the second set of queues. In some implementations, intermediate system 132 appends the session token to the web address (e.g., URL), which it transmits via the message.

Third-party system 134 obtains the message transmitted (e.g., via the queue) by intermediate system 132 (e.g., by accessing the queue). Third-party system 134 then transmits a web page request including the web address and session token to core server system 108 at 324. For example, the web page request can include a (Hypertext Transfer Protocol) HTTP request. Therefore, the session token is not provided by core server system 108 directly to third-party system 134

Core server system 108 processes the web page request including the web address and session token. More particularly, core server system 108 obtains the session token from the web page request and authenticates the web page request using the session token at 326. In addition, cores server system 108 may verify that the token lifetime has not expired.

Responsive to successfully authenticating the web page request, core server system transmits the web page to third-party system 134 at 328 (e.g., via a HTTP response). Third-party system 134 may then generate a document using the web page and provide the document to core server system 108 at 330. As described herein, the document may be stored in a data store for retrieval by core server system 108. The data store may be integral with third-party system. Thus, third-party system 134 need not communicate directly with core server system 108 regarding the document.

In some implementations, third-party system 134 transmits a document ready message (e.g., notify document ready message) to intermediate system 132 (e.g., via a queue of the second set of queues). Intermediate system 132 may retrieve the message from the queue, and send the message or a corresponding document ready message to core server system 108 (e.g., via a queue of the first set of queues).

Core server system 108 can obtain the document associated with the web page and generated by third-party system 134 server system. In some implementations, core server system 108 obtains the document ready message from a corresponding queue of the first set of queues and, in response, retrieves the document from the data store. Core server system 108 may then provide the document to the client device in response to the client request at 332.

In some implementations, core server system 108 stores the document in a database or other storage medium. Such storage can be performed automatically or in response to a user request.

In some implementations, core server system 108 implements a multi-tenant database system. In such a system, a tenant ID is used to ensure that data privacy is maintained for organizations supported by the multi-tenant database system, as will be described in further detail below with reference to FIG. 4.

Figure 4:
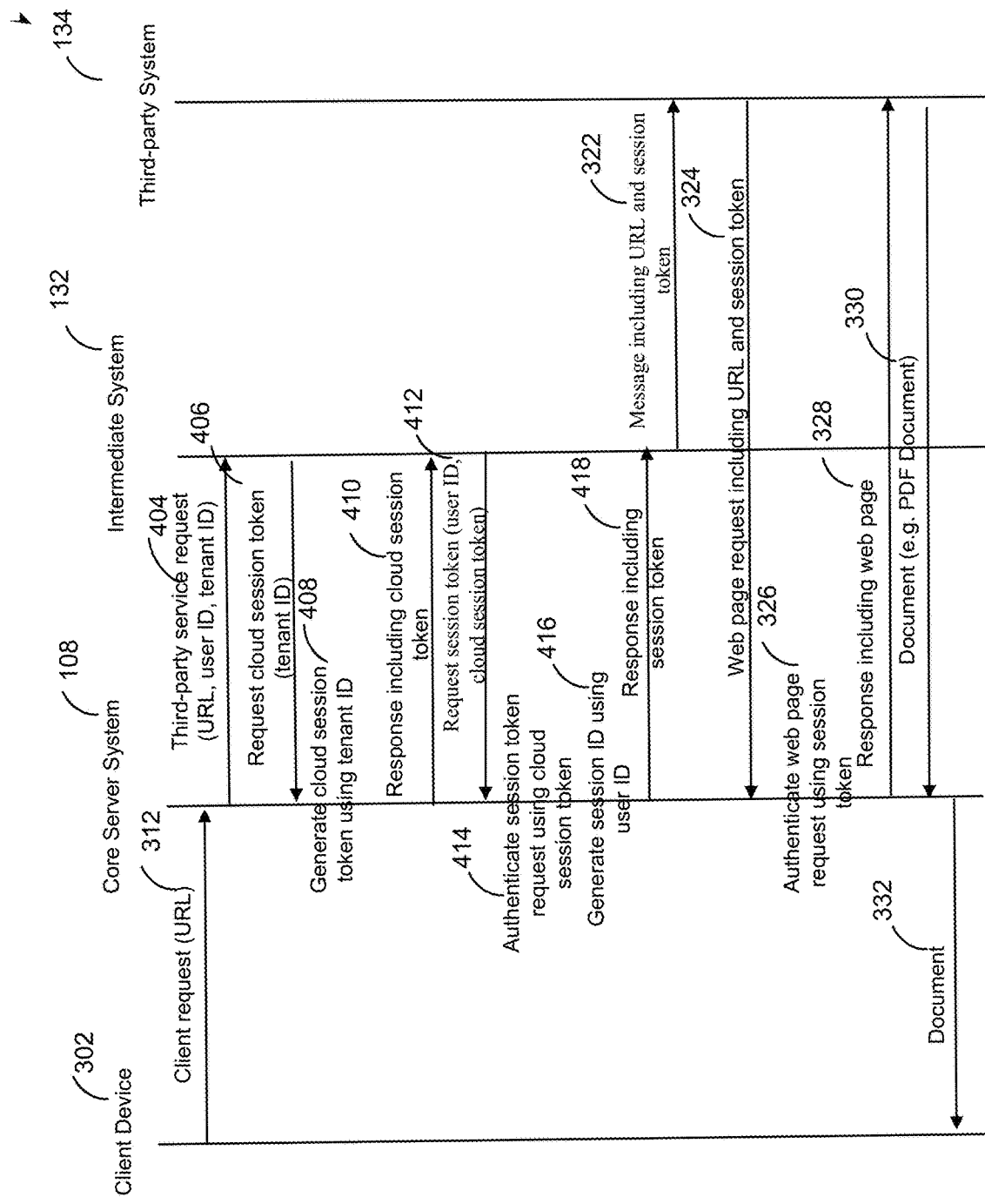
FIG. 4 is a transaction flow diagram of another example communication flow between components of a scalable computing system implemented in a multi-tenant database environment, in accordance with some implementations.

FIG. 4 is a transaction flow diagram of another example communication flow between components of a scalable computing system implemented in a multi-tenant database environment, in accordance with some implementations. In this example, a client request associated with a web page is transmitted by client device 302, where the user of the client device is associated with one of a plurality of tenants supported by a multi-tenant database system.

The client request is received by core server system 108 from the client device at 312. Responsive to the client request, core server system 108 transmits a third-party service request including a web address (e.g., URL) associated with the web page, the user ID, and tenant ID to intermediate system 132 at 404. As described above, the third-party service request can be transmitted via a queue of the first set of queues.

Intermediate system 132 receives or otherwise obtains the third-party service request (e.g., via the queue) and processes the third-party service request. Intermediate system 132 generates and transmits a cloud session token request including the tenant ID to core server system 108 at 406. The cloud session token request indicates a request for a cloud-to-cloud (C2C) session token, which may also be referred to as a cloud session token. The cloud session token request can be transmitted to core server system 108 via an API of core server system 108. Core server system 108 processes cloud session token request and generates a cloud session token using the tenant ID at 408. Core server system 108 then transmits the cloud session token to intermediate system 132 at 410. The cloud session token can be transmitted to intermediate system 132 via an API of intermediate system 132.

Intermediate system 132 subsequently generates and transmits a session token request including the user ID and cloud session token to core server system 108 at 412. For example, the cloud session token can be transmitted in a header of the session token request. The session token request can be transmitted to core server system 108 via an application programming interface (API) of core server system 108. Upon receiving the session token request from intermediate system 132, core server system 108 authenticates the session token request by validating the cloud session token at 414.

After core server system 108 has successfully authenticated the session token request using the cloud session token, core server system 108 generates a session token at 416. The session token can be generated, for example, using the user ID. Core server system 108 transmits a response including the session token to intermediate system 132 responsive to the session token request at 418. The session token can be transmitted to intermediate system 132 via an API of intermediate system 132. Intermediate system 132 can relay the web address and session token to third-party system 134 and the process proceeds, as described above with reference to FIG. 3. In this manner, a third-party system may obtain a session token that can be used to securely access a web page associated with a tenant of a multi-tenant database system.

Example core server processes of implementing a scalable computing system will be described in further detail below with reference to FIGS. 5A and 5B. More particularly, FIG. 5A illustrates a process of implementing a scalable computing system, while FIG. 5B illustrates a process of implementing two-stage authentication within a scalable computing system using a multi-tenant database system.

Figure 5A:
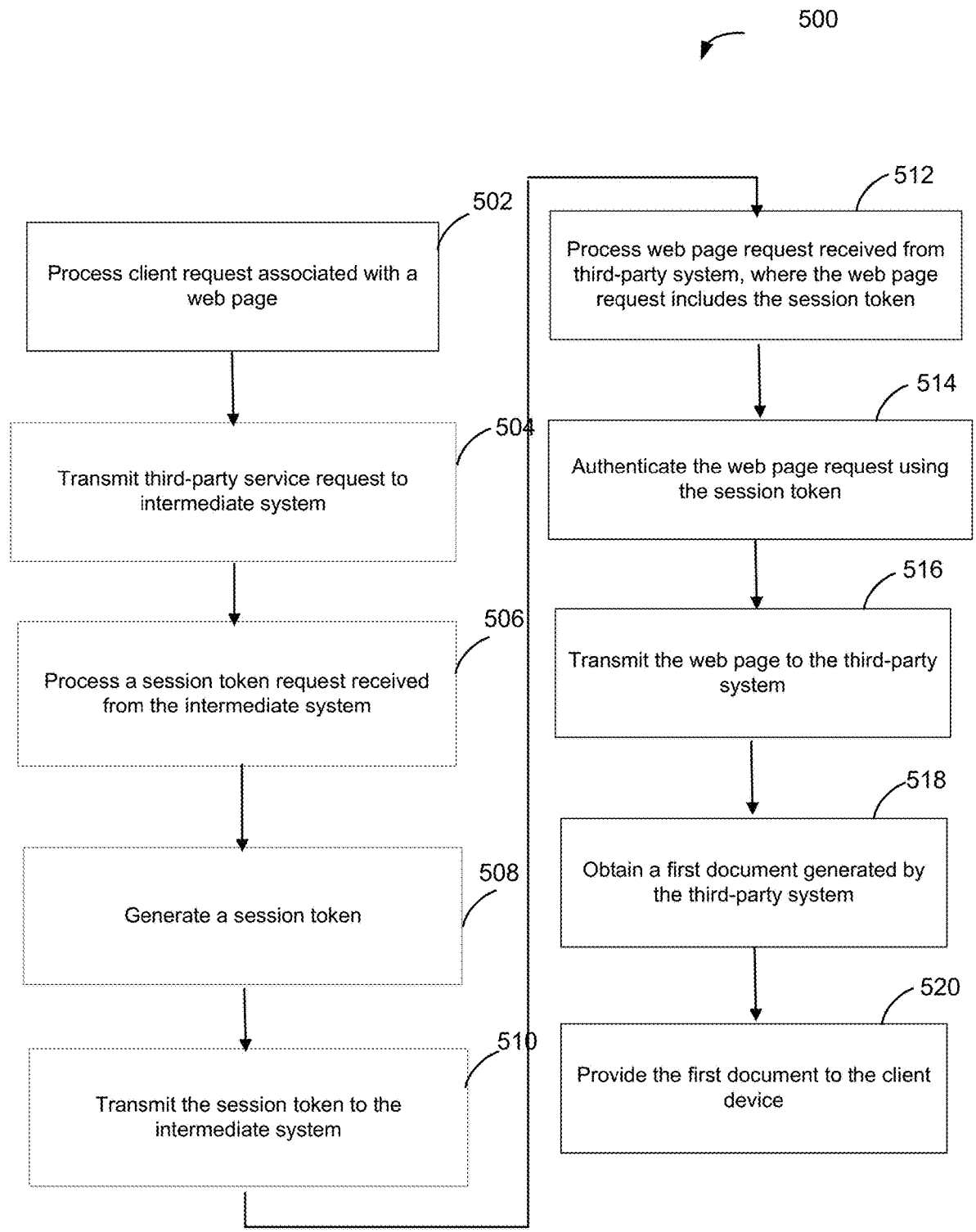
FIG. 5A shows a process flow diagram illustrating a method of implementing a scalable document generation system, in accordance with various implementations.
Figure 5B:
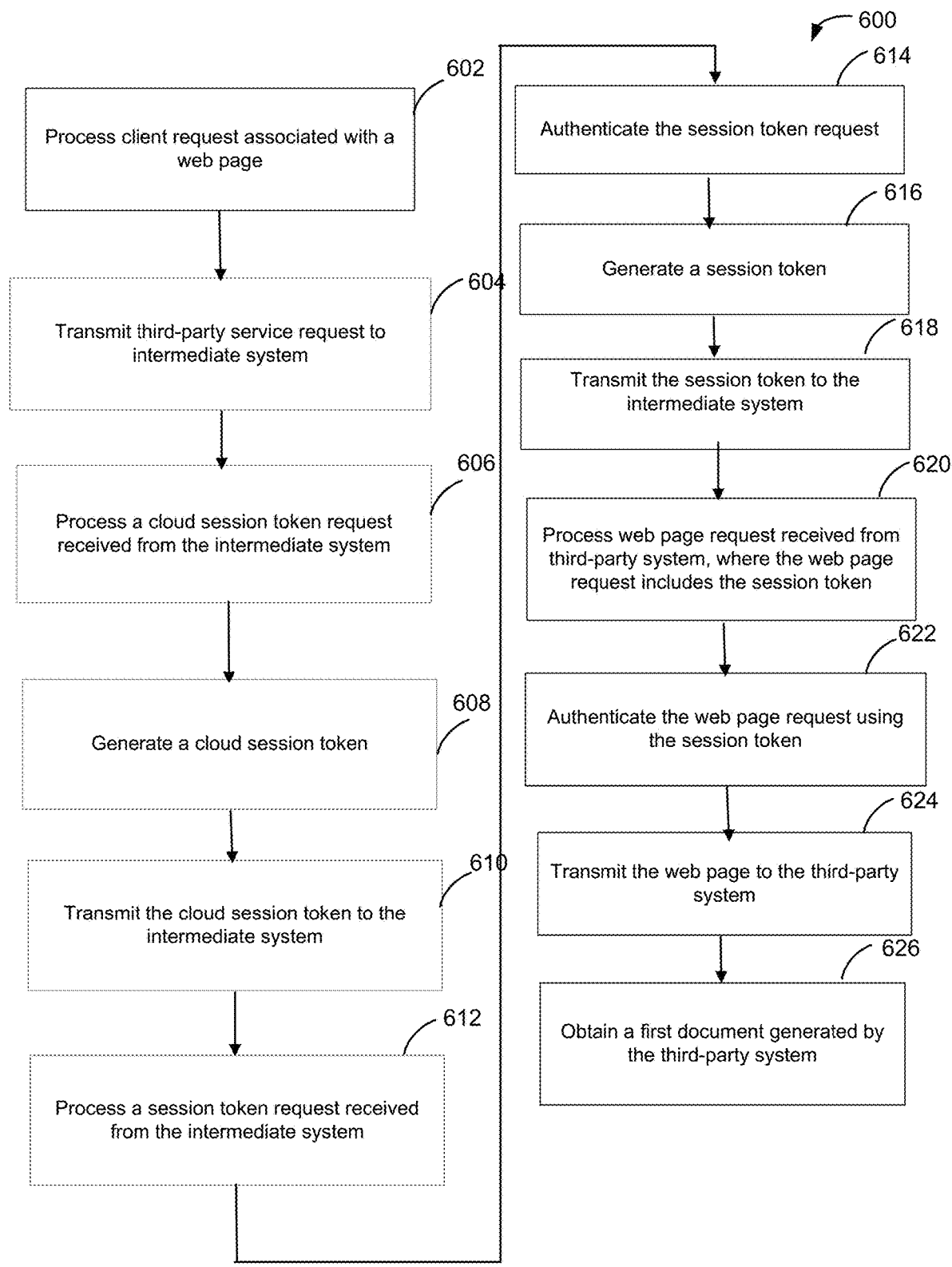
FIG. 5B shows a process flow diagram illustrating a method of facilitating two-stage authentication in a scalable computing system implemented in a multi-tenant database environment, in accordance with various implementations.

FIG. 5A shows a process flow diagram 500 illustrating a method of implementing a scalable document generation system, in accordance with various implementations. A server system processes a client request associated with a web page at 502, where the client request is received from a client device. For example, the client request can include a request for a PDF document.

Responsive to the client request, the server system transmits a third-party service request to an intermediate system at 504, where the third-party service request includes a web address associated with the web page and a user identifier. The third-party service request indicates a request for a third-party service, which may be provided by a third-party system. For example, the third-party service request can include a PDF generation request. In some implementations, the third-party service request is transmitted via a first queue of a first set of queues via which the core server system and third-party system communicate.

The server system processes a session token request received from the intermediate system at 506, where the session token request includes the user identifier. The server system may verify, using a user profile, that the user associated with the user ID is permitted to access the web page. The server system then generates a session token using the user identifier at 508, and transmits the session token to the intermediate system at 510 responsive to the session token request.

The intermediate system transmits a message including the web address and session token to a third-party system configured to provide the type of document requested by the user. For example, the message may be transmitted via a first queue of a second set of queues via which the intermediate system and third-party system communicate.

The server system processes a web page request received from the third-party system at 512, where the web page request includes the web address and session token. As described above, the session token is not provided by the server system directly to the third-party system.

The server system authenticates the web page request using the session token at 514. Responsive to authenticating the web page request, the server system transmits the web page to the third-party system at 516.

Upon generation of the requested document, the third-party system may notify the intermediate system that the document is available. In some implementations, the third-party system transmits a document ready message (or notify document ready message) to the intermediate system. For example, the document ready message may be transmitted to the intermediate system via a second queue of the second set of queues.

In some implementations, the intermediate system notifies the server system that a document generated by the third-party system is ready for retrieval. For example, the intermediate system may forward or transmit a document ready message to the server system via a second queue of the first set of queues in response to receiving the corresponding document ready message from the third-party system.

The server system obtains a first document associated with the web page and generated by the third-party system at 518. The first document can include a PDF document or other document. In some implementations, the server can obtain the first document from a data store in response to a message indicating that the document is ready for retrieval. For example, the server system may retrieve the first document from a storage medium responsive to processing a document ready message received from the third-party system. The server system then provides the first document to the client device at 520.

In some implementations, the authentication process is extended for implementation in a multi-tenant database environment. An expanded authentication process will be described in further detail below with reference to FIG. 5B.

FIG. 5B shows a process flow diagram 600 illustrating a method of facilitating two-stage authentication in a scalable computing system implemented in a multi-tenant database environment, in accordance with various implementations. As described above, a server system processes a login request received from a client device. The login request can include credentials such as a username and password. The server system authenticates a user of the client device using the credentials.

A server system processes a client request received from the client device at 602, where the client request is associated with a web page. Responsive to the client request, the server system transmits a third-party service request (e.g., via a queue) to an intermediate system at 604, where the third-party service request includes a web address associated with the web page and authentication information (e.g., user ID and tenant ID), where the third-party service request is a request for a third-party service provided by a third-party system. In accordance with various implementations, the credentials of the user are not provided to the intermediate system.

During a first authentication stage, a session token is generated and provided by the server system. More particularly, the server system processes a cloud session token request received from the intermediate system at 606, where the cloud session token request includes the tenant identifier. Responsive to processing the cloud session token request, the server system generates a cloud session token at 608 using the tenant identifier. The server system transmits the cloud session token to the intermediate system at 610. The server system processes a session token request received from the intermediate system at 612, where the session token request includes the user identifier and the cloud session token. For example, the server system may obtain the cloud session token from a header of the session token request.

The server system authenticates the session token request using the cloud session token at 614. For example, the server system may validate the cloud session token. Responsive to authenticating the session token request, the server system generates a session token using the user identifier at 616 and transmits the session token to the intermediate system at 618. As described above, the server system may configure the session token with a limited session token lifetime and store the session token lifetime in association with the session token.

The intermediate system may then transmit the web address and session token to the third-party system (e.g., via a queue), as described above. In this manner, the session token may be provided to the third-party system without exposing the credentials of the user to the third-party system.

During a second authentication stage, the session token is used by the third-party system to access the web page from the server system. More particularly, the server system processes a web page request received from the third-party system at 620, where the web page request includes the web address and session token. As described above, the session token is provided to the third-party system by the intermediate system; the session token is not provided by the server system directly to the third-party system. The server system authenticates the web page request using the session token at 622. Authentication can include verifying that the session token has not expired. Responsive to successfully authenticating the web page request, the server system transmits the web page to the third-party system at 624.

Once the third-party system has generated results (e.g., a document) using the web page, the third-party system may notify the intermediate system (e.g., via a queue) that the results are ready for retrieval by the server system. The intermediate system may forward the notification to the server system or generate a corresponding message that is transmitted to the server system (e.g., via a queue).

The server system obtains results generated by the third-party system in association with the web page at 626. For example, the results can include a document such as a PDF. The server system may then provide the document to the user or otherwise notify the user that the document is available for retrieval by the user.

The disclosed implementations enable a user of an organization to request results associated with a web page from a third-party system. Through the use of a scalable computing system including an intermediate system, the increasing demand for document generation by users of organizations can be supported. Moreover, through the use of a two-stage authentication process, the third-party system can be provided limited access to the web page, enabling the third-party system to generate and provide the requested document without compromising organizational data.

Some but not all of the techniques described or referenced herein are implemented using or in conjunction with a database system. Salesforce.com, inc. is a provider of customer relationship management (CRM) services and other database management services, which can be accessed and used in conjunction with the techniques disclosed herein in some implementations. In some but not all implementations, services can be provided in a cloud computing environment, for example, in the context of a multi-tenant database system. Thus, some of the disclosed techniques can be implemented without having to install software locally, that is, on computing devices of users interacting with services available through the cloud. Some of the disclosed techniques can be implemented via an application installed on computing devices of users.

Information stored in a database record can include various types of data including character-based data, audio data, image data, animated images, and/or video data. A database record can store one or more files, which can include text, presentations, documents, multimedia files, and the like. Data retrieved from a database can be presented via a computing device. For example, visual data can be displayed in a graphical user interface (GUI) on a display device such as the display of the computing device. In some but not all implementations, the disclosed methods, apparatus, systems, and computer program products may be configured or designed for use in a multi-tenant database environment.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 6A:
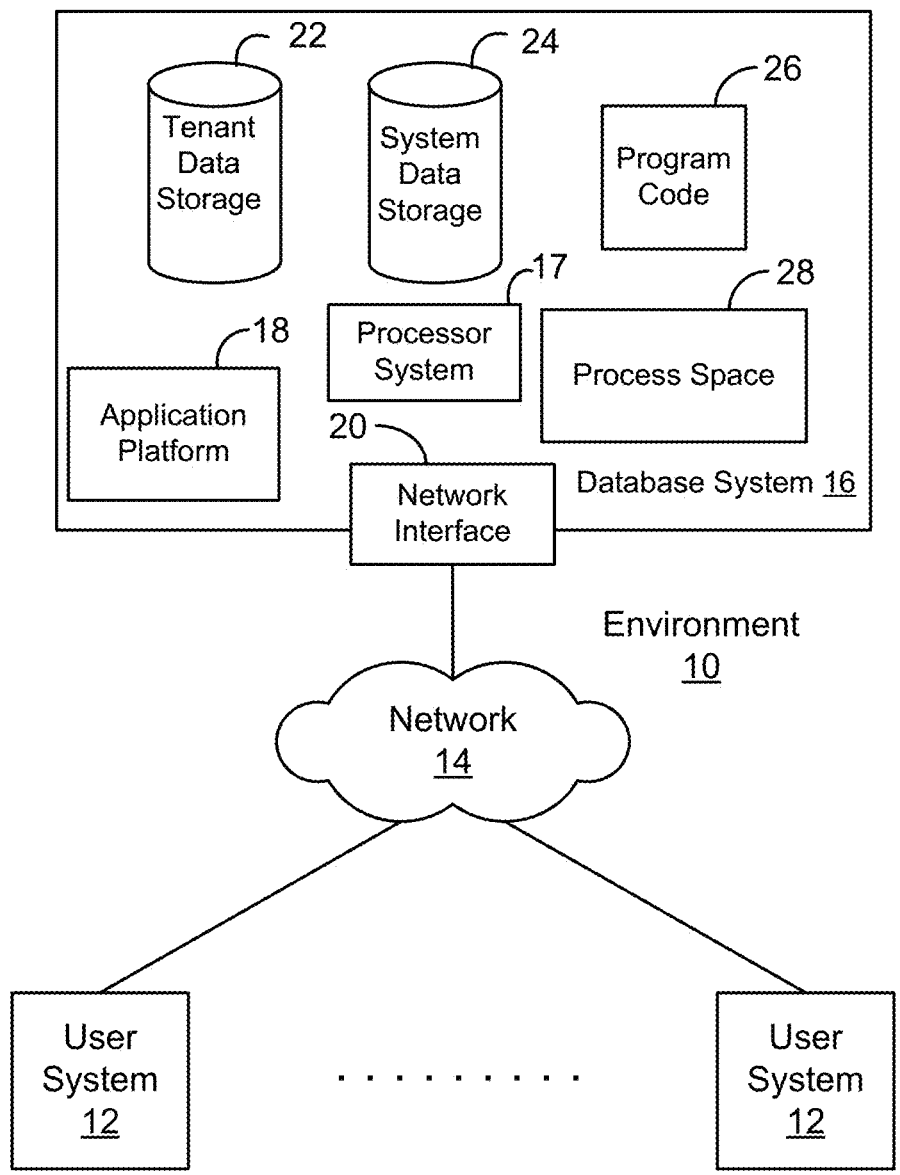
FIG. 6A shows a block diagram of an example of an environment 10 in which an on-demand database service can be used in accordance with some implementations.

FIG. 6A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 7A:
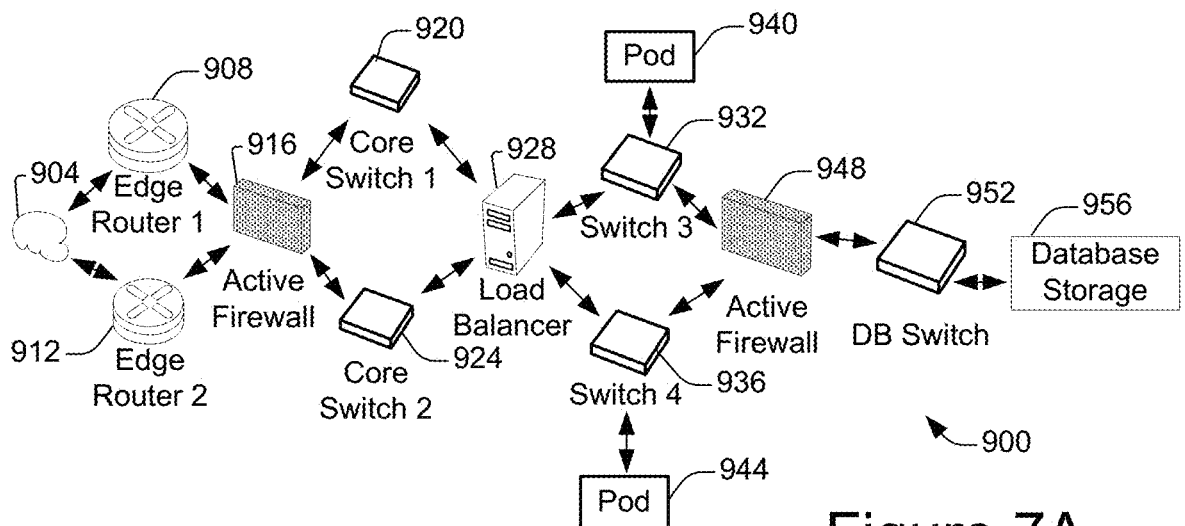
FIG. 7A shows a system diagram of an example of architectural components of an on-demand database service environment 900, in accordance with some implementations.
Figure 7B:
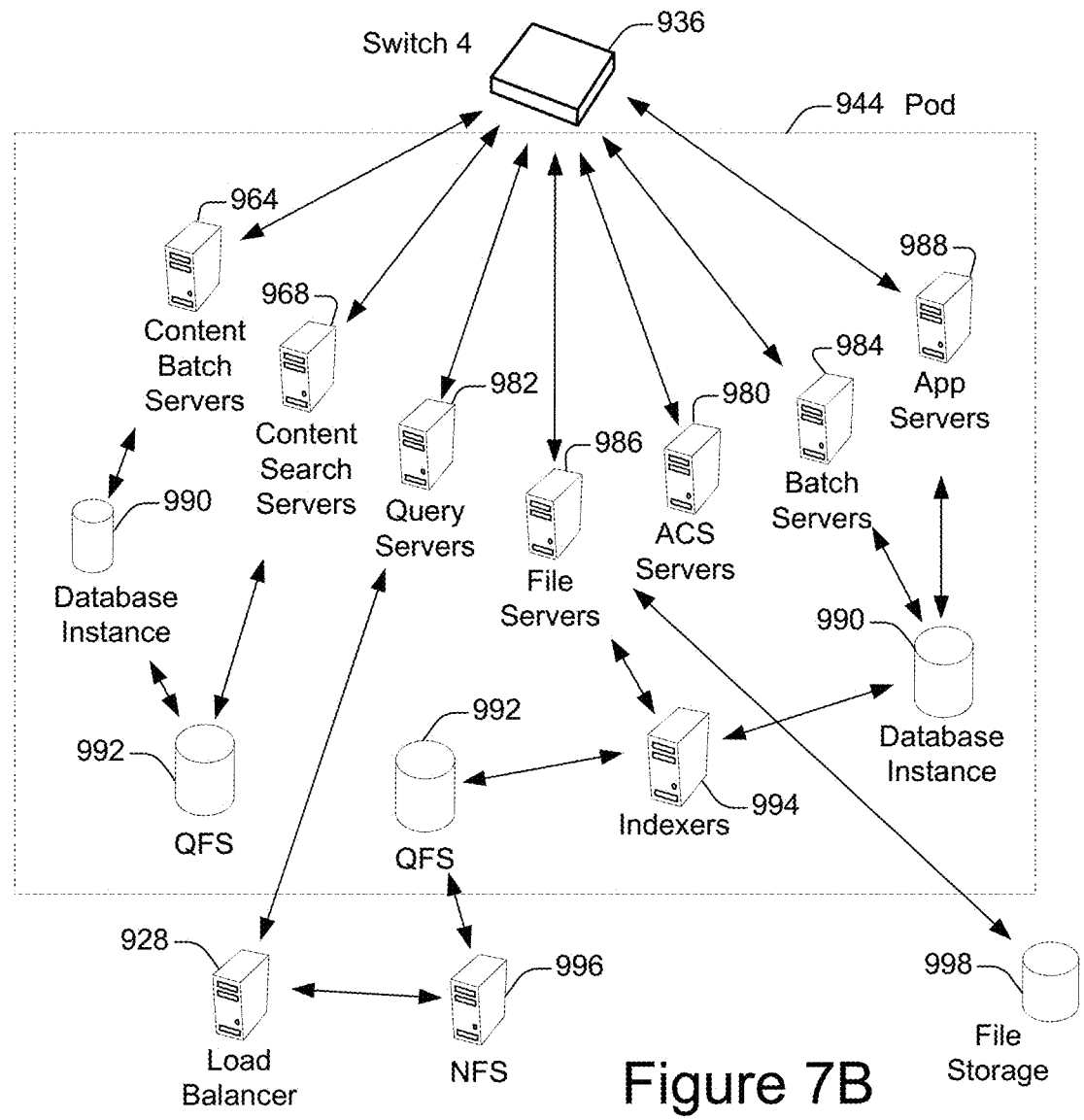
FIG. 7B shows a system diagram further illustrating an example of architectural components of an on-demand database service environment, in accordance with some implementations.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen. LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium. e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language. Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 6B:
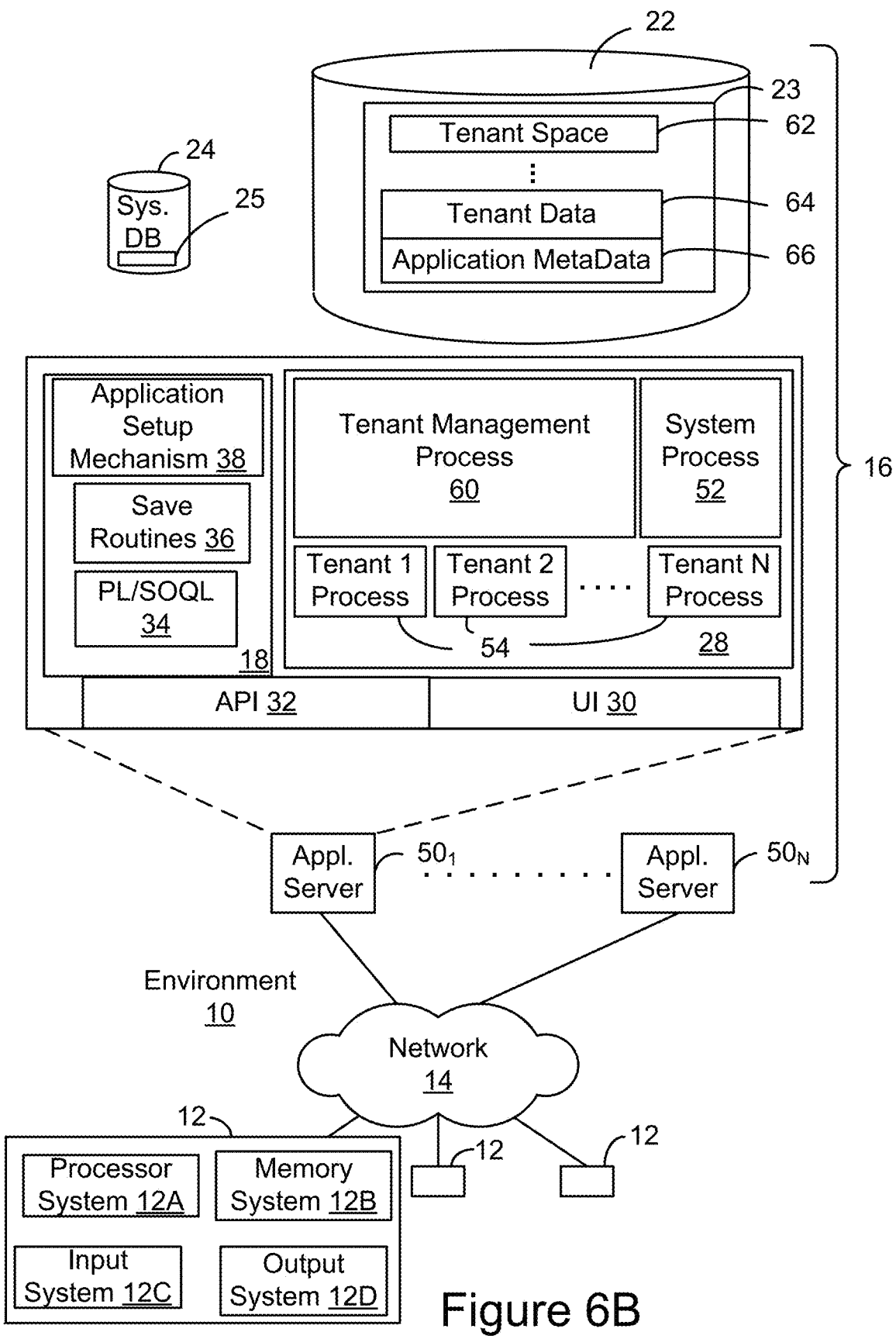
FIG. 6B shows a block diagram of an example of some implementations of elements of FIG. 6A and various possible interconnections between these elements.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 7A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 7A and 7B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 7A and 7B.

FIG. 7B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, California. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 7B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 7B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 6A, 6B, 7A and 7B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 6A, 6B, 7A and 7B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2®, by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A method, comprising:

processing, by a server system, a client request associated with a web page, the client request being received from a client device;

responsive to the client request, transmitting, by the server system, a third-party service request including a web address associated with the web page and authentication information to an intermediate system, the third-party service request being a request for a third-party service, the authentication information including a user identifier and a tenant identifier associated with a tenant of a multi-tenant database;

processing, by the server system, a cloud session token request received from the intermediate system, the cloud session token request including the tenant identifier;

responsive to processing the cloud session token request, generating, by the server system, a cloud session token using the tenant identifier;

transmitting, by the server system, the cloud session token to the intermediate system;

processing, by the server system, a session token request received from the intermediate system, the session token request including the user identifier and the cloud session token;

authenticating the session token request using the cloud session token;

responsive to authenticating the session token request, generating, by the server system, a session token using the user identifier;

transmitting, by the server system, the session token to the intermediate system responsive to the session token request;

processing, by the server system, a web page request including the web address and session token, the web page request being received from a third-party system, wherein the session token is not provided by the server system directly to the third-party system;

authenticating, by the server system, the web page request using the session token;

responsive to authenticating the web page request, transmitting, by the server system, the web page to the third-party system; and obtaining, by the server system, results generated by the third-party system in association with the web page.

2. The method of claim 1, further comprising:

processing, by a server system, a login request received from a client device, the login request including credentials;

authenticating, by the server system, a user of the client device using the credentials, the credentials including a username and password, wherein the credentials are not provided to the intermediate system or the third-party system.

3. The method of claim 1, further comprising:

transmitting, by the intermediate system, a message including the session token and web address to the third-party service.

4. The method of claim 3, wherein transmitting the message comprises providing the message via a queue.

5. The method of claim 1, further comprising:

configuring, by the server system, a token lifetime associated with the session token;

wherein authenticating the web page request using the session token includes verifying that the session token has not expired.

6. The method of claim 1, further comprising:

obtaining the cloud session token from a header of the session token request;

wherein authenticating the session token request includes validating the obtained cloud session token.

7. The method of claim 1, the session token request being received from the intermediate system via an application programming interface (API).

8. A system comprising:

a database system including a processor and memory, the database system implemented using a server system, the database system configurable to cause:

processing, by the server system, a client request associated with a web page, the client request being received from a client device;

responsive to the client request, transmitting, by the server system, a third-party service request including a web address associated with the web page and authentication information to an intermediate system, the third-party service request being a request for a third-party service, the authentication information including a user identifier and a tenant identifier associated with a tenant of a multi-tenant database;

processing, by the server system, a cloud session token request received from the intermediate system, the cloud session token request including the tenant identifier;

responsive to processing the cloud session token request, generating, by the server system, a cloud session token using the tenant identifier;

transmitting, by the server system, the cloud session token to the intermediate system;

processing, by the server system, a session token request received from the intermediate system, the session token request including the user identifier and the cloud session token;

authenticating the session token request using the cloud session token;

responsive to authenticating the session token request, generating, by the server system, a session token using the user identifier;

transmitting, by the server system, the session token to the intermediate system responsive to the session token request;

processing, by the server system, a web page request including the web address and session token, the web page request being received from a third-party system, wherein the session token is not provided by the server system directly to the third-party system;

authenticating, by the server system, the web page request using the session token;

responsive to authenticating the web page request, transmitting, by the server system, the web page to the third-party system; and obtaining, by the server system, results generated by the third-party system in association with the web page.

9. The system of claim 8, the database system further configurable to cause:

processing, by a server system, a login request received from a client device, the login request including credentials;

authenticating, by the server system, a user of the client device using the credentials, the credentials including a username and password, wherein the credentials are not provided to the intermediate system or the third-party system.

10. The system of claim 8, the database system further configurable to cause:

transmitting, by the intermediate system, a message including the session token and web address to the third-party service.

11. The system of claim 10, wherein transmitting the message comprises providing the message via a queue.

12. The system of claim 8, the database system further configurable to cause:

configuring, by the server system, a token lifetime associated with the session token;

wherein authenticating the web page request using the session token includes verifying that the session token has not expired.

13. The system of claim 8, the database system further configurable to cause:
obtaining the cloud session token from a header of the session token request;
wherein authenticating the session token request includes validating the obtained cloud session token.

14. The system of claim 8, the session token request being received from the intermediate system via an application programming interface (API).

15. A non-transitory computer-readable medium storing computer-readable instructions that, when executed, cause one or more processors to perform steps comprising:
processing, by a server system, a client request associated with a web page, the client request being received from a client device;
responsive to the client request, transmitting, by the server system, a third-party service request including a web address associated with the web page and authentication information to an intermediate system, the third-party service request being a request for a third-party service, the authentication information including a user identifier and a tenant identifier associated with a tenant of a multi-tenant database;
processing, by the server system, a cloud session token request received from the intermediate system, the cloud session token request including the tenant identifier;
responsive to processing the cloud session token request, generating, by the server system, a cloud session token using the tenant identifier;
transmitting, by the server system, the cloud session token to the intermediate system;
processing, by the server system, a session token request received from the intermediate system, the session token request including the user identifier and the cloud session token;
authenticating the session token request using the cloud session token;
responsive to authenticating the session token request, generating, by the server system, a session token using the user identifier;
transmitting, by the server system, the session token to the intermediate system responsive to the session token request;
processing, by the server system, a web page request including the web address and session token, the web page request being received from a third-party system, wherein the session token is not provided by the server system directly to the third-party system;

authenticating, by the server system, the web page request using the session token;
responsive to authenticating the web page request, transmitting, by the server system, the web page to the third-party system; and
obtaining, by the server system, results generated by the third-party system in association with the web page.

16. The non-transitory computer-readable medium of claim 15, the non-transitory computer-readable medium storing computer-readable instructions that, when executed, cause one or more processors to perform steps further comprising:
processing, by a server system, a login request received from a client device, the login request including credentials;
authenticating, by the server system, a user of the client device using the credentials, the credentials including a username and password, wherein the credentials are not provided to the intermediate system or the third-party system.

17. The non-transitory computer-readable medium of claim 15, the non-transitory computer-readable medium storing computer-readable instructions that, when executed, cause one or more processors to perform steps further comprising:
transmitting, by the intermediate system, a message including the session token and web address to the third-party service.

18. The non-transitory computer-readable medium of claim 17, wherein transmitting the message comprises providing the message via a queue.

19. The non-transitory computer-readable medium of claim 15, the non-transitory computer-readable medium storing computer-readable instructions that, when executed, cause one or more processors to perform steps further comprising:
configuring, by the server system, a token lifetime associated with the session token;
wherein authenticating the web page request using the session token includes verifying that the session token has not expired.

20. The non-transitory computer-readable medium of claim 15, the non-transitory computer-readable medium storing computer-readable instructions that, when executed, cause one or more processors to perform steps further comprising:
obtaining the cloud session token from a header of the session token request;
wherein authenticating the session token request includes validating the obtained cloud session token.

* * * * *